United States Patent [19]

Carr et al.

[11] 4,233,132
[45] Nov. 11, 1980

[54] METHOD AND APPARATUS FOR PRODUCING HYDROGEN

[76] Inventors: Randall Carr, 4624 S. Georgia, Amarillo, Tex. 79110; L. E. Geoffroy, 6214½ Belpree, Amarillo, Tex. 79106; Rodger H. Flagg, 1415 Lynn Ave., Fort Wayne, Ind. 46805; Donald L. Carr, 3103 S. Pittsburg, Amarillo, Tex. 79103

[21] Appl. No.: 21,457

[22] Filed: Mar. 19, 1979

[51] Int. Cl.³ .................... C10G 15/00; C25B 15/00; C25B 9/00; C25B 1/02
[52] U.S. Cl. ................................ 204/169; 204/129; 204/170; 204/225; 204/228; 204/270; 204/278; 204/DIG. 8
[58] Field of Search ............ 204/129, 136, 168–172, 204/278, 225, 258, DIG. 8, 164–165, 270; 166/60, 248, 260, 265–267, 305 R

[56] References Cited
U.S. PATENT DOCUMENTS

| | | | |
|---|---|---|---|
| 1,379,077 | 5/1921 | Blumenberg, Jr. | 204/136 |
| 1,837,519 | 12/1931 | Bleecker | 204/136 |
| 1,862,952 | 6/1932 | Bleecker | 204/278 X |
| 2,029,748 | 2/1936 | Weber | 204/136 X |
| 2,660,556 | 11/1953 | Butler | 204/172 X |
| 2,994,377 | 8/1961 | Trantham | 166/260 X |
| 3,696,866 | 10/1972 | Dryden | 166/248 |
| 4,037,655 | 7/1977 | Carpenter | 166/60 X |

FOREIGN PATENT DOCUMENTS

| | | | |
|---|---|---|---|
| 42-24312 | 11/1967 | Japan | 204/129 |
| 47-33284 | 7/1970 | Japan | 204/129 |

*Primary Examiner*—John H. Mack
*Assistant Examiner*—D. R. Valentine

[57] ABSTRACT

Electrodes are immersed within oil which forms a layer over a quantity of water. When current is passed between the electrodes which are held to a predetermined gap from the interstitial surface between the oil and water, water is caused to undergo electrodecomposition. Gaseous hydrogen is then recovered in the sealed space above the oil-water layers and the oxygen is caused to react with constituents in the oil layer.

Consequently, there is produced continuously a quantity of hydrogen which is separately collected and is usable in gaseous form.

19 Claims, 8 Drawing Figures

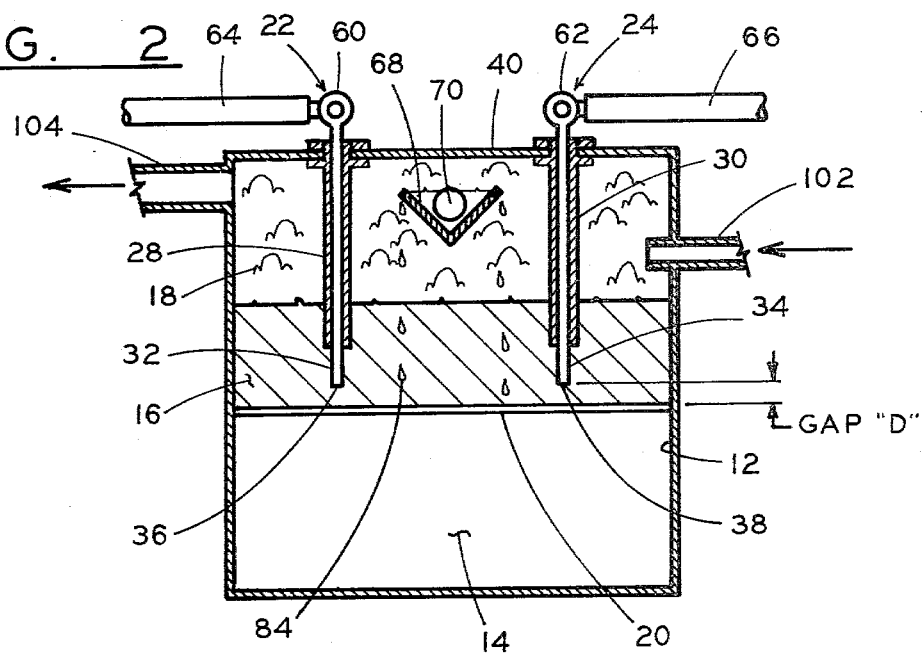
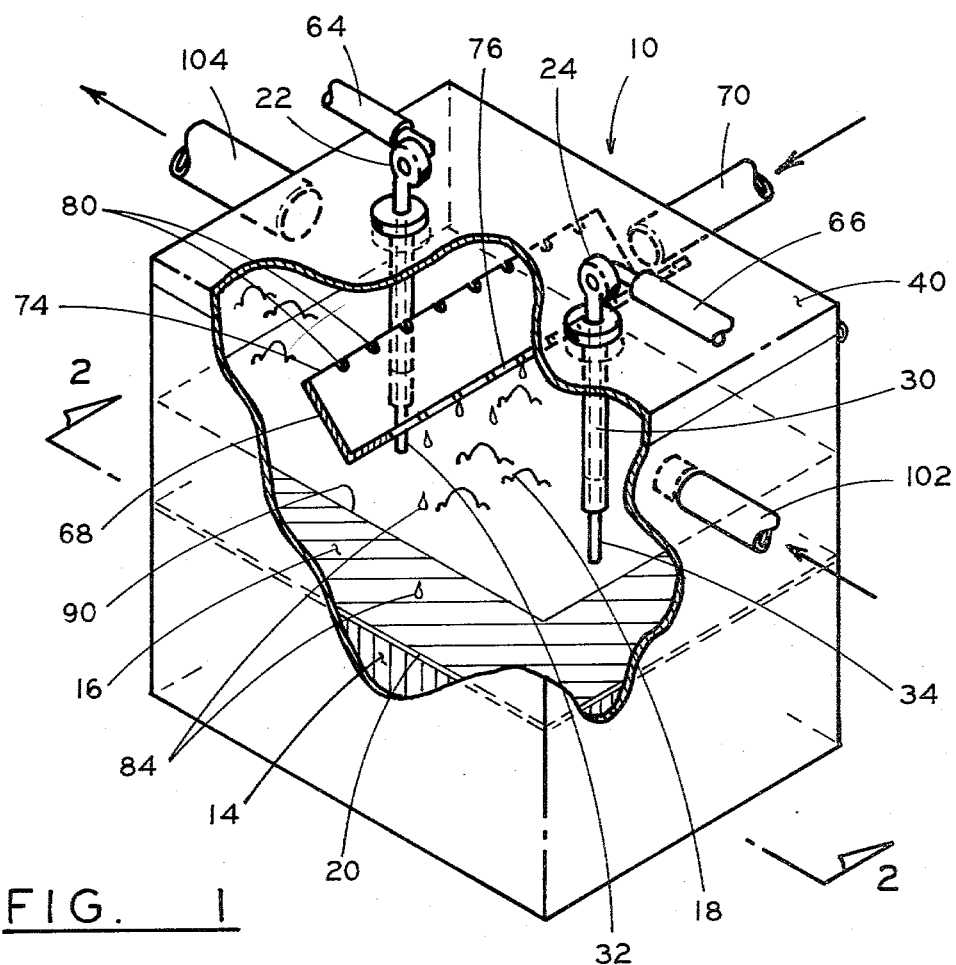

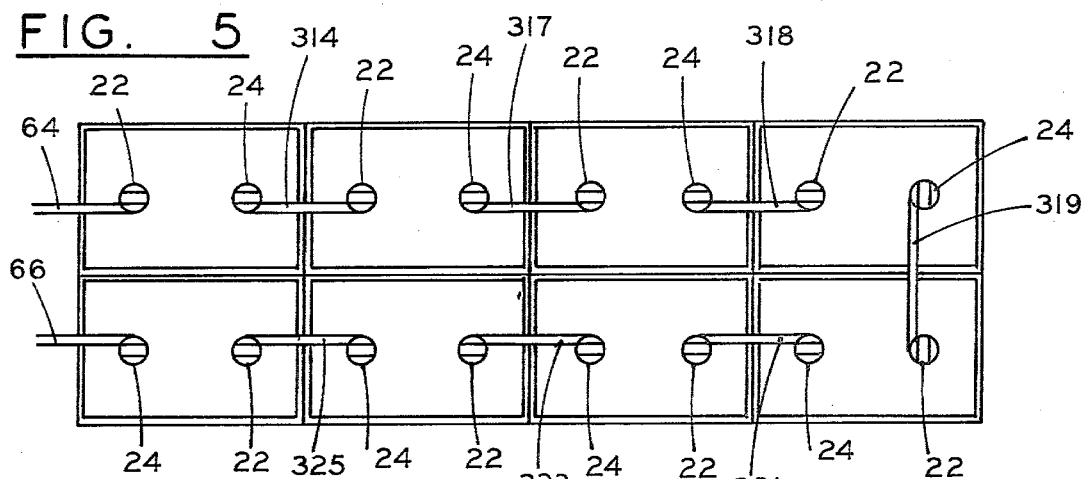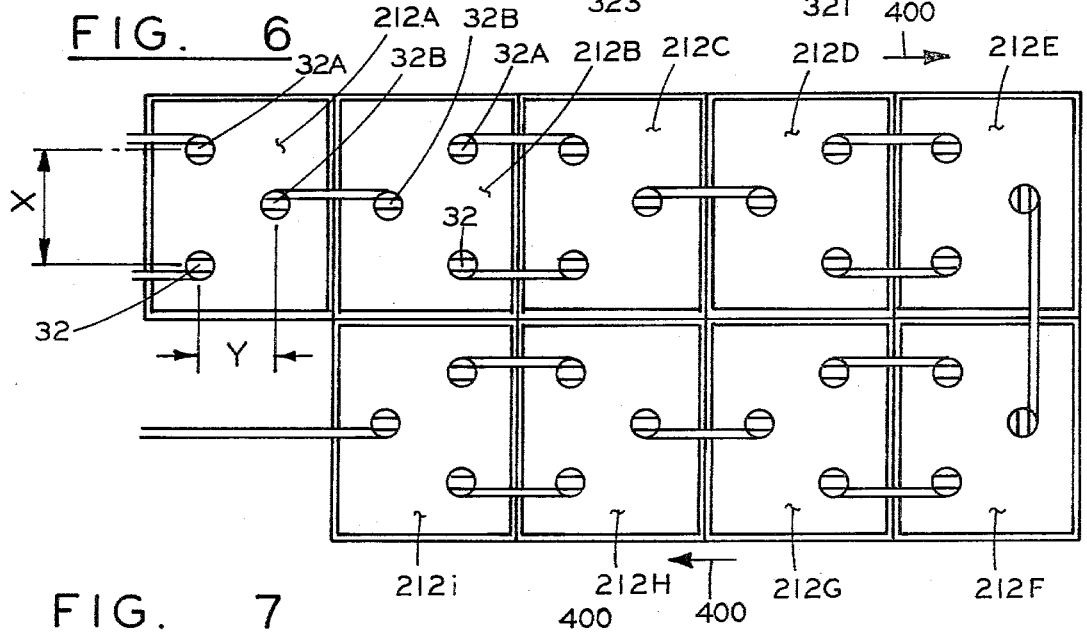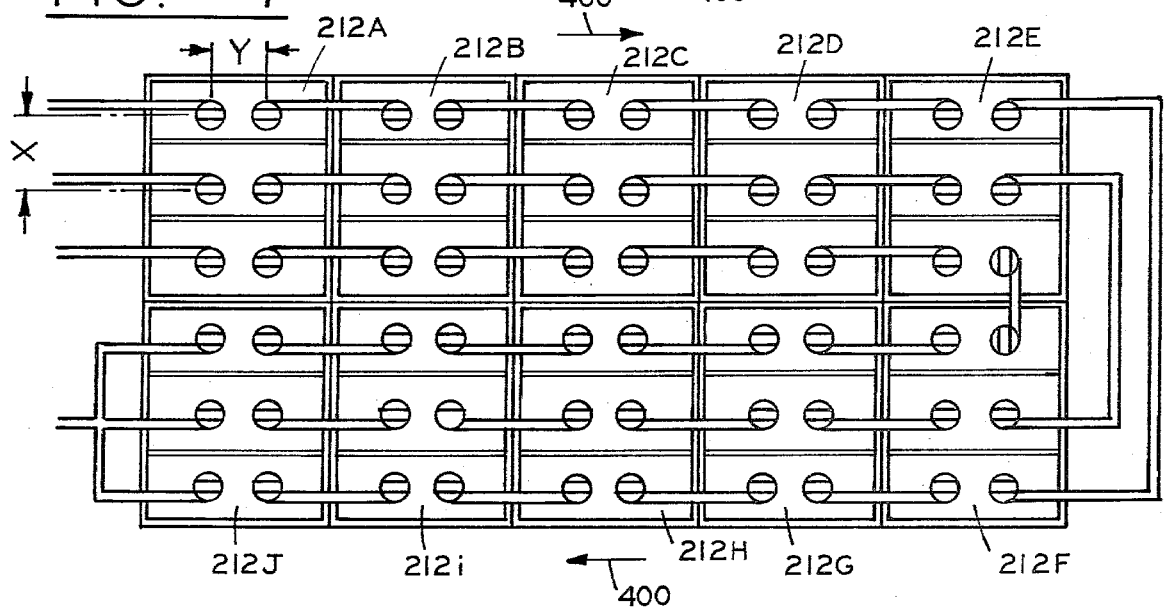

METHOD AND APPARATUS FOR PRODUCING HYDROGEN

BACKGROUND OF THE INVENTION

It has been known that a current passed through water will produce an electrodecomposition of the water into its constituent gases, hydrogen and oxygen. It has been further known that passage of a current through hydrocarbon produces a fracturing of certain of the hydrogen-carbon bonds, producing lighter phase hydrocarbons such as acetylene, ethylene, methane, as well as hydrogen; but it has proved difficult to accomplish from a commercially acceptable cost viewpoint, the production of relatively pure hydrogen gas from either of these starting materials. When electrodecomposition occurs of oil or water, hydrogen is produced to the accompaniment of these other gases.

Hydrogen is a readily available fuel, but it is impractical to use because of its expensive production. It is an ideal fuel because of pollution-free byproducts. It burns controllably, has adequate BTU content and for combustability it has few equals.

Burning hydrogen simply produces water vapor and, from a home-heating standpoint, eliminates the requirement for vents, flues, and the like. Internal combustion engines can readily adapt to hydrogen as a fuel and the combustion product, being water, is totally pollution-free. With these advantages, it is remarkable that the art has not utilized hydrogen as a preferred fuel. The answer lies in the fact that hydrogen is not a readily available fuel as might be thought; its generation is expensive and requires, in relation to the BTU output, more than a comparable energy input to produce from the starting materials, so that the energy balance is unfavorable.

Another use of hydrogen is, it can be blended with other gases in preferred amounts, and in that form is useful for pressurizing spent oil wells to develop secondary oil recovery. It has been known for some time that repressurizing spent oil wells is useful in the operation of secondary and sometimes tertiary oil recovery.

One of the applications of the present invention is in conjunction with our pending application, Ser. No. 953,075, filed Oct. 20, 1978, "APPARATUS AND PROCESS FOR THE RECOVERY OF OIL".

It has been found that gases for pressurizing oil wells may be developed not only at the subsurface but also at ground level and such constituent gases including hydrogen and other gases such as air, are provided to the well in pressurized condition. Hydrogen when used in approximately 8% to 15% by volume of the pressurized gas is highly useful. Repressurization of oil wells, while not part of the present invention, is mentioned only insofar as the present invention is an available source of hydrogen for utilization in the secondary and tertiary oil recovery operations.

SUMMARY OF THE INVENTION

It is one of the foremost objects of the present invention to provide both process and apparatus for the production of hydrogen by electrochemical means in which the hydrogen is produced as almost a pure flow of hydrogen only slightly adulterated by gases which can be relatively easily removed, thus providing pure hydrogen.

It is another object of the present invention to provide both process and apparatus for producing hydrogen by electrochemical means utilizing in conjunction with water a hydrocarbon oil petroleum fraction which is readily available. The electrochemical decomposition is caused to occur by imposing an alternating current voltage between electrodes which are immersed in the oil and are spaced a critical distance from the interstitial boundary separating the oil and the water. Upon passing a current between the electrodes, there is found to develop an unexpected result in which essentially only the water is decomposed into its constituent hydrogen and oxygen gases, with the hydrogen being liberated into the space above the oil-water layers but the oxygen becoming bound either at the reaction situs or within the hydrocarbon oil layer by reacting with the hydrocarbon constituents.

While there are additional gases which are generated and are found above the oil-water layers, the amount of such additional gases is relatively small, and such gases are relatively easy to remove from the hydrogen in conventional manners, to that the hydrogen is readily available in almost pure form.

It is another object of the present invention to provide by efficient process and apparatus, the development of hydrogen gas with a relatively small energy input so that it is practical to use electrodecomposition means for developing hydrogen gas and in a safe and suitable manner. Thus, at the time the hydrogen gas is produced, there is effective separation of oxygen to preclude the dangerous condition of a hydrogen-oxygen mixture which is known to be highly explosive.

It is another feature of the present invention that the electrodecomposition can occur either in a single cell or multiple cell arrangement, depending upon the volume of hydrogen gases required and which utilize as the electrical energy input for effecting the decomposition, either in single-phase, 2-phase or 3-phase alternating current preferably of 60-cycle per second, preferred.

It is an overall object of the present invention to provide an efficient means for converting a liquid phase material into hydrogen gas. In this case the material is water. Explosive conditions which might otherwise occur, and which have been encountered in the prior art, are effectively precluded by separating the gases into hydrogen and other gases, within a hermetically sealed chamber. Direct exposure to arcing within the chamber by imposition of electrical energy is at all times prevented. To make this clearer, the electrical discharge occurs between electrodes which are disposed at all times within a hydrocarbon layer, and this layer is less reactive than is either the water or the hydrogen generated from the water. By so separating the two layers of gas and water and confining the situs of reaction to the oil and the interstitial boundary between the oil and water, it is possible to obviate the dangerous conditions of hydrogen generation which occur in the conventional art. It is that factor, together with others, which makes the present invention practical.

All of the different applications of the present invention cannot be enumerated in the present application. Quite obviously, had there been a ready means available for generating a pure output of hydrogen through simple and practical means, hydrogen could be readily used for many purposes, as, for example, powering internal combustion engines, hydrogenating food oils, treatment of olefinic compounds in organic synthesis and distillation procedures, etc.

While the present invention does not list all of the different applications where a steady and reliable source of hydrogen is needed, all such applications are deemed to be served by the teaching of the present invention as adjuvants of the present invention.

Other objects and features of the present invention will become apparent from a consideration of the following description which proceeds with reference to the accompanying drawings, wherein example embodiments of the invention are selected by way of illustration and not by way of restriction.

DETAILED DESCRIPTION OF THE DRAWINGS

FIG. 1 is a perspective view of a single cell installation, illustrating a first embodiment of the invention;

FIG. 2 is a cross-sectional view of the single cell illustrated in FIG. 1 taken along lines 2—2 in FIG. 1;

FIG. 5 is a schematic view of a single phase AC multicell probe installation and circuit;

FIG. 6 is a schematic view of a two-phase AC multicell probe installation and circuit;

FIG. 7 is a schematic view of a three-phase AC multicell probe installation and circuit; and, FIG. 8 is a perspective view of the probe gas-adjustment by which the critical distance between the end of the probe and the intersticial layer between the oil and the water is established.

DETAILED DESCRIPTION OF THE PREFERRED EMBODIMENTS

Figure 4:
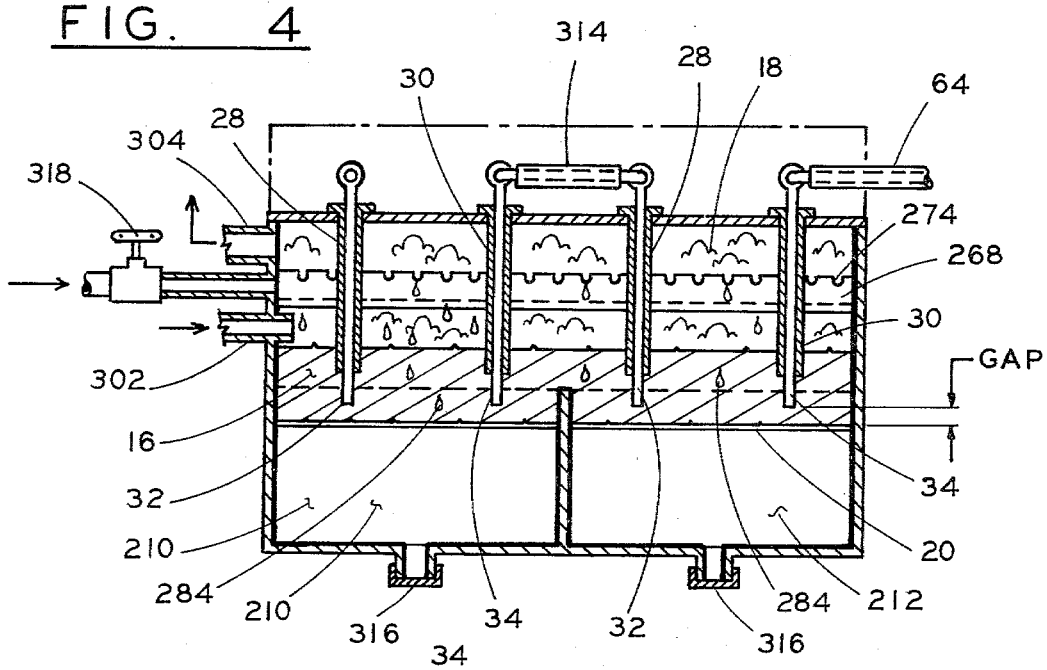
FIG. 4 is a cross sectional view of the embodiment shown in FIG. 3 taken along lines 4—4 in FIG. 3.

Referring to FIGS. 1 and 2, there is illustrated a simple cell 10 having an internal chamber 12 with a water layer 14, oil layer 16 and gaseous layer 18. Between the oil and the water is an immissible boundary layer 20, sometimes referred to herein as an interstitial boundary layer.

Extending within the oil layer are a pair of electrodes 22, 24 which have surrounding insulation sleeves 28, 30.

The insulation sleeves 28, 30 extend into the oil layer 16 so that the bare electrode sections 32, 34 are totally oil-immersed and the bare ends 36, 38 of the electrodes are a preferred distance "d" from the interstitial boundary 20 between the immersible oil and water.

Figure 8:
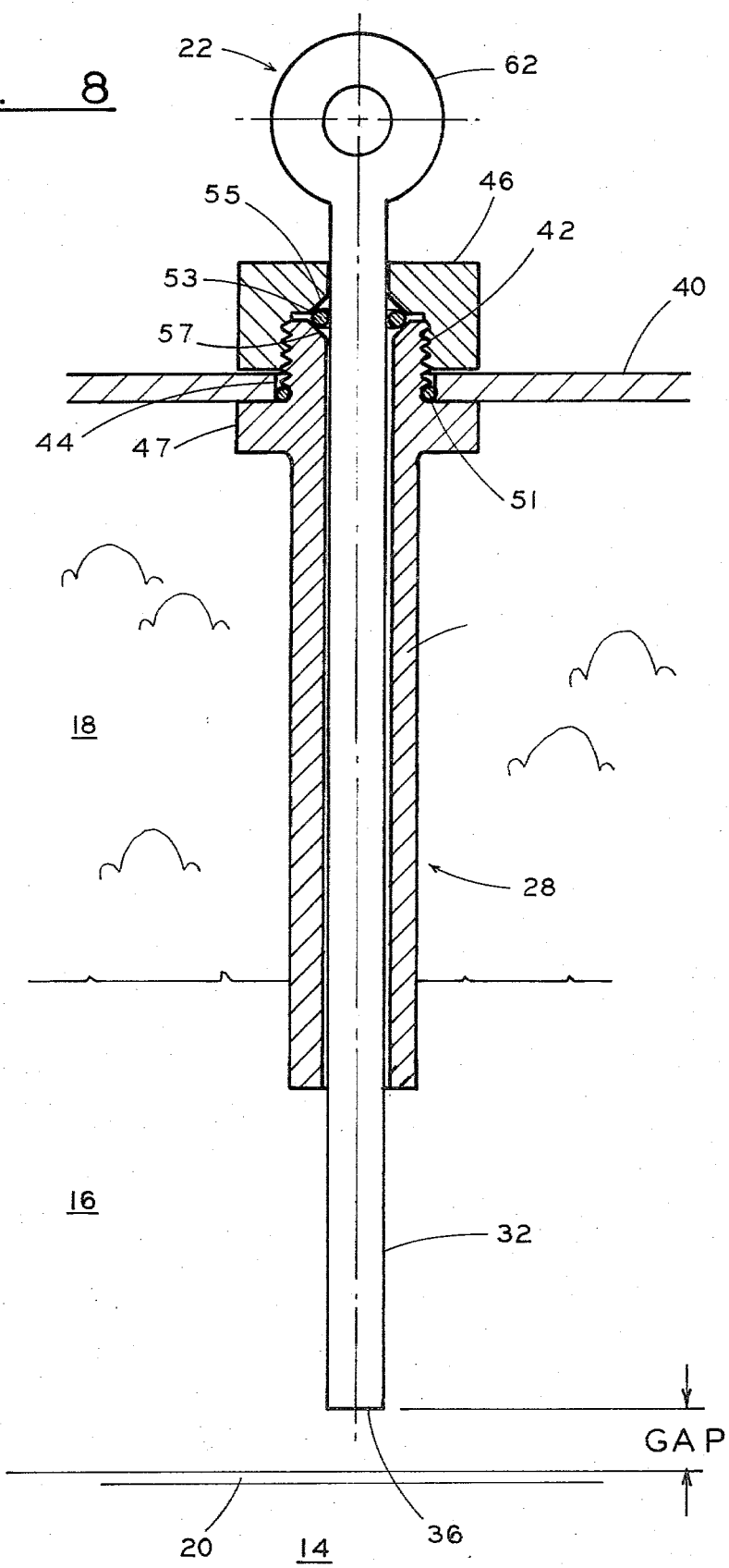

In order to obtain this preferred distance, there is mounted at the raisable upper closure side 40 of the cell a threaded end 42 of the insulator 28,30 which passes through an opening 44 with a threaded nut 46 received thereon. By turning the threaded nut in one direction or the other, it is possible to clamp or release the electrode 22, 24 relatively to the insulation layer or sleeve 28 (FIG. 8).

The threaded insulator 42 is held in place by means of a locking nut 46 and annular boss 47 which engage the undersurface 49 of nut 46 and the opening is hermetically sealed since the O-ring 51 seals opening 44 and O-ring 53 is forced by tapered opening 55 against the complementary tapered opening 57 at the end of the plug 42.

If it is necessary from time to time to vary the clearance "d" this can be accomplished by simply backing the threaded nut 46 off and slipping the electrode 22 up or down within the sleeve 28 to adjust for the correct clearance.

The ends 60, 62 of each electrode are suitably connected one to each of insulated conductors 64, 66 which communicate AC voltage of 60 cycles per second and of the preferred voltage value.

Above the liquid layers is a V-shaped cross section trough 68 which is supplied with water from a conduit 70. At the outer edges 74, 76 of the V-shaped trough, are a plurality of spaced notches 80 which develop a succession of spaced drops 84 of water which fall first onto the upper surface 90 of the oil layer 16 and then, being heavier than the oil, settle downwardly and replenish the water layer 14 since the water layer 14 is exhausted from the electro-decomposition of the water to its constituent hydrogen and oxygen gases.

It has been found that within the gaseous phase there is predominantly present hydrogen. There is virtually no presence of the stoichiometric quantity of oxygen which would have been predictable based upon the mole ratio of water decomposed and calculated further from the generated hydrogen. This has given rise to extensive speculation as to what has happened to the oxygen.

It has been observed that the electrical discharge occurs within the oil layer at the gap "d" and an electrical energy path leads from the respective ends 36, 38 of the electrodes 22, 24 downwardly to the interstitial boundary 20 between the oil layer 16 and water layer 14 and from there is developed an electrical path laterally through the water layer to the other electrode.

It can be observed that the electrical discharge occurs primarily within this observed area. This has given rise to the speculation which, taken together with the fact that it is only the water which is essentially electrochemically decomposed, that there has developed within the hydrocarbon layer, a series of free radicals which play at least some role in the transferral of electrical energy to develop the circuit between the electrodes. During operation, there is little change in the quantity of the hydrocarbon petroleum layer, but in the water layer, whether the pH is 7 or is made electrically conductive to a greater extent by the addition of electrolyte, the water will successively exhausted. Thus, while it is possible to account for the hydrogen according to the reaction:

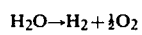
$$H_2O \rightarrow H_2 + \tfrac{1}{2}O_2$$

the missing constituent, oxygen, can be accounted for only on the basis of its reactivity with highly mobile-and-reactive, free radicals of hydrocarbon which are formed by cleaving at least some of the hydrogen-carbon bonds within the petroleum layer. It has been observed that the petroleum layer changes in its viscosity and appearance, to a certain extent, suggesting the development of hydrocarboxy compounds, such as ethers, ketones and aldehydes.

As mentioned previously, the gap "d" is essential to maintain throughout the operation, and this is obtained by means of incoming make-up water which is introduced to the system through the trough 68 by means of which a steady stream of incoming droplets is developed as incoming water to balance the conversion rate of water to hydrogen, and thus maintain the gap "d" as before described.

Make-up oil, to the extent that it is required, is supplied to the system by means of an inlet line 102 and the gases are vented to storage through outlet line 104.

Typically, there is used 60-cycle, 120-volt current, and the oil layer 16 is panhandle crude. Utilizing distilled water, it is possible to produce a steady outflow of hydrogen utilizing the described apparatus, the volume produced per cell being approximately 4 cu.ft. of hydrogen per hour derived from a current consisting of a primary of 13 amps and 120–125 volts and a secondary of 120 miliamps and 12,000 volts imposed across the electrodes 30, 32.

Initially, the gap "d" between the ends 36, 38 of the electrodes and the interstitial layer 20, is reduced until the sparking action occurs, and the oil layer 14 is heated from ambient temperature to approximately 165° F.–195° F., and the water layer 16 increases in temperature to approximately 55° F.–85° F., at which time the operating gap of each electrode is immersed to approximately $\frac{1}{4}''$ to $1\frac{1}{2}''$. The lateral spacing between the electrodes is variable without affecting the quantity of gas produced, and is in the preferred embodiment, from 2 to 6 inches. It should be understood that the lateral spacings of the electrodes are not critical as distinguished from the criticality in the probe gap which commences somewhat smaller than the one-quarter inch gap and then proceeds by adjustment to up to a one and one-half inch gap for continuous operation.

It was found that when the oil and water layers were heated initially to temperatures greater than the 150° F. for the water and 200° F. for the oil, these temperatures reduced during operation to the operating temperatures of 55° F.–85° F. for the water and 165° F.–195° F. for the oil. Regardless of the initial superheated condition of the oil and water, equilibrium temperatures in operation are those for the water and oil respectively. These temperatures are understood to be ranges rather than absolute values, the oil (depending upon its composition) ranges from 165° F. to about 195° F.

Also, the gap for the electrode from the interstitial surface 20 is somewhat variant, depending upon the conductivity of the oil. For example, when the layer 14 is composed of crank case oil, which tends to be less conductive than, for example, panhandle crude, the gap of each electrode must be reduced to approximately $\frac{1}{4}''$ in order to effect the current transfer between the end of the probe and the interstitial layer 20. On the other hand, with panhandle crude, which is more conductive (probably because of higher water content), the gap should be greater, in the range of $\frac{1}{4}''$ to $1\frac{1}{2}''$ per electrode.

Utilizing distilled water and panhandle crude in the amount of about two quarts of water and about one quart of supernatant oil, the following test results were obtained:

| ANALYSIS OF SAMPLE BY CHROMATOGRAPH: | | | |
|---|---|---|---|
| ACTUAL | | CALCULATED AIR FREE | |
| H | 73.84% | H | 81.00% |
| $CO_2$ | 8.61 | $CO_2$ | 9.50 |
| N | 6.39 | N | 0.00 |
| O | 2.97 | O | 0.00 |
| $C_1$ | 4.07 | $C_1$ | 4.49 |
| $C_2$ | 0.26 | $C_2$ | 0.29 |
| $C_3$ | 0.78 | $C_3$ | 0.86 |
| $C_4$ | 0.34 | $C_4$ | 0.38 |
| $nC_4$ | 0.25 | $nC_4$ | 0.28 |
| $iC_5$ | 0.15 | $iC_5$ | 0.17 |
| $nC_5$ | 0.15 | $nC_5$ | 0.17 |
| $C_6+$ | 2.19 | $C_6+$ | 2.42 |
| TOTAL = | 100.00% | TOTAL = | 99.56% |

-continued

| ANALYSIS OF SAMPLE BY CHROMATOGRAPH: | |
|---|---|
| ACTUAL | CALCULATED AIR FREE |
| SPECIFIC GRAVITY (CALCULATED) = .457 | SPECIFIC GRAVITY (CALCULATED) = .400 |
| VOLUME PRODUCED PER CELL = 4 cu.ft./Hr | |
| OPERATING TEMPERATURE: 56° F. (gas) | |
| 178° F. (Oil) | |
| 64° F. (Water) | |

MULTICELL EMBODIMENT

Figure 3:
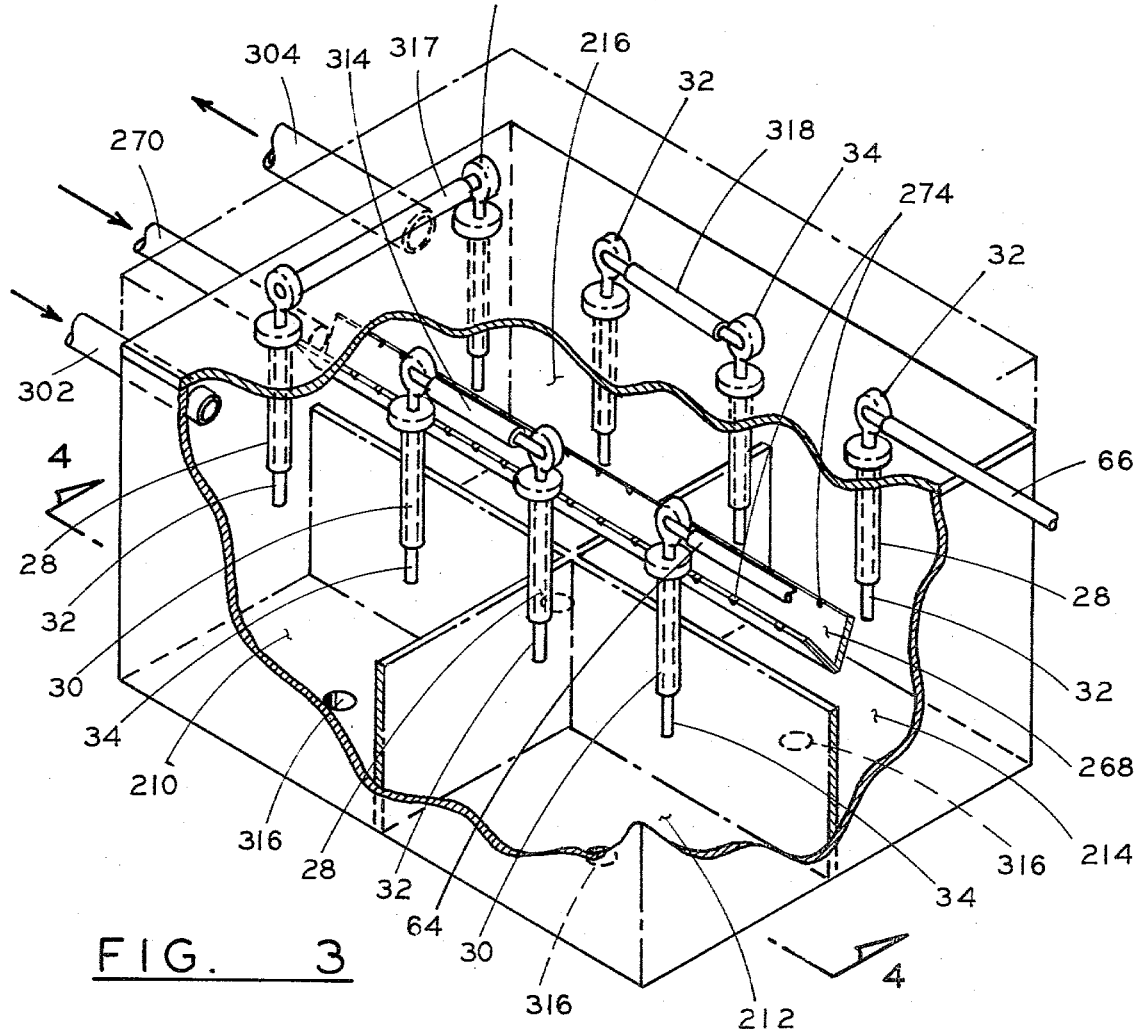
FIG. 3 is a perspective view of a second embodiment of the invention wherein there are utilized multiple cells.

Referring next to the embodiment of FIGS. 3, 4, in these embodiments it is essential for the same reason as in the previous embodiment, that at least part of the insulation for the electrodes extends below the oil surface so that no sparking can occur between the electrodes within the volume containing the gas. Otherwise, this could cause an explosion. Therefore, it is critical in both this multicell embodiment, as well as in the single cell embodiment, that the insulation 28, 30 be maintained below the upper surface of the oil layer 16.

In this embodiment, unlike the previous embodiment, there are a number of cells 210, 212, 214, 216, in which the electrodes are connected in series so that there occurs within each cell essentially the same electrical decomposition of water and scavanging of the oxygen as in the previous embodiment. In the multicell operation indicated in FIGS. 3, 4, the respective cells are separated by insulation barriers 218, which form quadrants, electrically separating each of the respective cells so that the described electrochemical decomposition of water will occur separately and independently within the respective cells. There is a voltage drop from cell to cell which, nevertheless, taken with the current flow, is sufficient to effect substantially equal electrodecomposition of the water in the respective cells. Each cell is equally productive of hydrogen generation because each cell is supplied with a common supernatant layer of oil.

In this embodiment, there is also a common supply of water from inlet line 270 as well as inlet line for oil 302. Because of oil supernatant layer is common to each of the cells, the electrodes do not require individual adjustment. The water layers, however, are individually extant within the respective cells, and the electrodecomposition occurs independently in the respective cells by reason of the isolation of the water and its separate electrodecomposition. The respective electrodes are connected in each cell by means of through buss bars 314 which are of such size that they contribute substantially no electrical resistance, all the voltage drop occurring by the conductivity between the electrodes within the respective cells and which causes the electrodecomposition of the water in the manner previously described.

Each cell has its separate and individual drain 316 for the water. Other than the manner of electrical connection and spacing of the electrodes, each electrode pair operates in the same manner as previously described for the single cell operation. That is to say, the gap considerations are the same, the lateral spacing is the same, the generation of hydrogen gas is the same. The hydrogen gases which are developed are outletted from a common outlet main 304, such gases being collected at a central collecting point where the gases are burned, or utilized in the manner previously described, or subjected to separation operation designed to remove the gaseous hydrocarbon phase which accompanies the hydrogen.

For continuous operation, there is a controlled inflow of make-up water which is controlled by a valve 318 whereby the incoming water which enters the trough 268 and includes the notches 274, will generate a series of drops 284 as previously described, such droplets dropping as a finely subdivided droplet inflow which sprinkles the upper surface of the oil layer, then permeates downwardly through the oil layer and enters the water layer 214 to constitute make-up water for that which is electrochemically decomposed to the hydrogen and oxygen. It has been found that with multicell operation, the composition of gases is approximately the same; that is, the operation provides an outflow of hydrogen but very little if any oxygen is formed, and taking into account the stoichiometric equation by which it could have been an expected one-half mole of oxygen to be developed for each mole of hydrogen, strongly suggests that the oxygen has been reacted with the free radicals of petroleum within the hydrocarbon layer. That this is so is substantiated experimentally by a marked increase of hydrocarboxy compounds in the form of ethers, oxides and aldehydes.

In operation, with multicells, each cell is charged with water to a level which is below the level of the insulation barriers 218. The cells are then filled to a preferred level with oil, the oil layer encompassing all of the individual subdivided cell chambers. The electrodes are positioned with the ends, initially forming a small gap from the interstitial oil-water layer, a current is then imposed, commencing from one electrode to the next, each of the electrodes being connected in series, so that each pair separately effects electrodecomposition and within its respective cell, and each being isolated in an electrical sense from the adjoining cells. As noted in FIG. 3, the electrical voltage is applied commencing with the electrode pair in cell 212, which are then connected by buss 314 to one of the electrode pair in 210. Buss 317 then connects to one of the electrode pair in cell 216, buss 318 connects to one of the electrode pair in cell 214, thus completing the circuit.

In this invention, as in the previous one, the electrodes are leveled and the gaps are adjusted appropriately to the conductivity in the oil layer by varying the quantity of water input, and the gap is adjusted to be smaller at the start of the operation until the constituent water and oil is heated to the equilibrium temperature at which time the gap is adjusted to be greater, by the incoming water flow, and such flow is then adjusted to precisely compensate for the exhausting water so that the gap is not lowered or changed because of electrochemical decomposition. The gases formed, principally hydrogen, are generated in multiples of the single cell hydrogen generation. Thus, for example, where the gases are generated in the quantity of approximately four cu.ft. per hour with single cell operation described, approximately four times that is produced with the multiple cell arrangement described.

It should be understood that in the present invention the AC current can be in the form of either single phase, 2-phase or 3-phase, the circuit diagram being as approximately illustrated in FIGS. 5, 6, 7. For example, in a multicell arrangement of FIG. 5, and assuming single-phase AC current, the arrangement of electrodes is substantially the same as that illustrated in FIG. 3, in which the respective cells are electrically insulated from each other at the water level, each pair of electrodes is connected by electrically conductive buss bars means so that current flow depends upon current passage between electrodes within respective cell and the voltage is transmitted from cell to cell by buss bar means.

As illustrated in FIG. 6, within each respective cell are arrangements of three electrodes, 32, 32A, 32B. The critical dimension in this case is a greater separation "X" between electrodes 32 and 32A as compared with the displacement "Y" between either of 32 or 32A and probe 32B, so that the current flow, taking into account the electrical resistivity, will always be between electrodes 32 and 32A to 32B. Similarly, the electrode 32B in the next successive cell 212B has a similar arrangement of electrodes again meeting the critical conditions of the displacements "X" and "Y", such that the distance between electrodes and the predominant direction of the flow of current indicated by the arrow 400, will always be of a smaller dimension than the lateral distance between electrodes 32 and 32A in the respective cells 212A, 212B, 212C, 212D, 212E, 212F, 212G, 212H, 212I.

Referring next to the embodiment shown in FIG. 7, where there is 3-phase current flow within the respective cells 212A through 212J, are subdividing insulating barriers which prevent electrical condictivity between probes except in the direction 400.

Thus, the 3-phase current flows between adjoining probes through the solution of water effecting the electrodecomposition of the water in the same manner previously described, with the difference being that there are three probes instead of two, as in the embodiment of FIG. 6, and one, as in the embodiment of FIG. 5.

Buss bars at the ends of the respective row of cells, provide for a return flow of current in the manner shown at the bottom side of FIG. 7 by reference numeral 400.

The use of single-phase, 2-phase, 3-phase, or any multi-phase is within the scope of the present invention, and the particular choice of multi-phase AC current is a matter of design preference. D.C. current may also be employed. Wiring may be in series or in parallel.

As previously noted, the distance of the gap from the bottom portion of the electrode to be interstitial layer, is critical. This adjustment can be made externally of the cell, by controlling the water level on which the oil layer floats to initially level the electrodes. Referring to FIG. 8, the upper end 62 of the electrode can be drawn upwardly or downwardly to vary the height of the electrode within each chamber. The electrode can be adjusted vertically by first loosening the nut 46, adjusting the appropriate clearance of the electrode to effect the proper clearance "D" and then turning the nut 46 to clamp the electrode in place, and effect the appropriate hermetic seal whereby none of the gas 18 in the gaseous chamber 90 can escape through the opening 44 in the cover 40.

OPERATION

In operation, a voltage of either AC or DC voltage, either single phase, 2-phase or 3-phase, is imposed across the electrodes.

The electrodes in the case of multi-cell operation can be connected either in series or in parallel.

It should be understood that the circuit diagram, method of wiring the electrodes, the shielding between electrodes, is not a part of the present invention.

In operation, the electrodes are adjusted to provide a gap of the required dimension illustrated in FIG. 8, this being accomplished by manually adjusting the electrode to its preferred position.

In operation, the oil layer and water layer reach an equilibrium temperature whether the starting temperature is above or below that equilibrium temperature.

In operation, the gases which are collected above the oil layer, are continuously collected, and water incoming from line 70 fills the trough 68 and, in the vicinity of the notches 80, there develop drops 84 which are sprinkled over the surface of the oil layer, permeate downwardly, and enter the water layer 14 to compensate for the water which is electrically decomposed into its constituent gases.

The rate of incoming water exactly balances the rate of electrodecomposition of the water.

From time to time, make-up oil is added from line 102 so that the oil layer 16 is replenished.

The oil layer 16 serves not only to separate the gaseous layer 18 from the ends of the electrodes, and thus preclude detonation of the hydrogen by sparking, but also serves to insulate the electrodes in the different cells where there is a common oil layer and a multi-cell operation. Thus, referring to FIGS. 3 and 4, in addition to the insulating barriers 218 which isolate the respective cells, the oil layer also serves to confine the electrochemical decomposition of water in the respective cells so that each functions in a quasi-independent fashion.

In multi-cell operation, each cell is provided with a water make-up, oil make-up, and the liberated hydrogen is collected in a common chamber.

The purpose of multi-cell operation is to increase the capacity of the apparatus and method for producing hydrogen gas.

It is an essential part of the present invention that the designer have this freedom of choice in obtaining a preferred generation rate for hydrogen within a given electrical capacity.

After the gases are collected, the hydrogen can be separated from the residual gases generally in the form of low molecular weight, hydrocarbon gases such as methane, acetylene, ethane, etc., or the combination of gases can then be blended with air, pressurized, and transmitted to the base of an exhausted oil well to facilitate by repressurization the tertiary or secondary recovery of oil. It has been found that the addition of hydrogen serves as valuable supplement to air when pressurizing spent oil wells in these secondary and tertiary oil recovery operations.

In readying the single-cell illustrated in FIGS. 1 and 2, the cell is first filled to the preferred level with water, then with oil, the gap position being maintained by manual adjustment of the electrodes, and the operation commences with the electrode gap initially being somewhat smaller than required after the composition materials are heated to equilibrium temperature. Once the materials, i.e., oil and water layers, reach equilibrium temperature, the gap increases, and that gap is maintained by balancing the inflow of water from line 70 with the rate of decomposition of the water within the water layer 14.

Because the oil or hydrocarbon layer changes in composition and in its ability to have reactivity with the oxygen, the oil must be replaced or blended with make-up oil. As previously noted, some of the oil is also subjected by electrodecomposition effect to smaller chain hydrocarbons, and this also necessitates the addition of make-up from time to time.

Although the gap distance "d" has been found to have some criticality, the lateral spacing of the electrodes has not been found to have a measurable or significant criticality. Factors which do not appear to greatly effect the process is the area of the tank. While it can be speculated that there is a role played by the magnetic field, either as a direct or a side effect, either because it acts to circulate the oil or promotes the electrolytic action described herein, is not known. It is known, however, that with the factors explained and taught in this specification, the results of the invention are attainable, notwithstanding the speculative or theoretical basis upon which the invention might be construed. It is known, however, that power factor does have an effect. As the power factor increases, the volume of generation of gas similarly tends to increase. Again, while height of thickness of the oil layer is variable, it is found that more than approximately 3 inches of oil is preferred for the oil layer. Many different sources of oil have been used, including crank case oil, panhandle crude, and all with approximately equivalent results. As previously stated, the method for electrically connecting the electrodes, whether in series or parallel, whether single or multi-phase, whether direct or alternating current, is not critical to the invention.

Although the present invention has been illustrated and described in connection with certain example embodiments, it will be understood that these are selective and are exemplary of the invention and are not restrictive thereof. It is reasonably to be expected that those skilled in this art can make numerous revisions and adaptations of the invention and it is intended that such revisions and adaptations will be construed as being within the limits the scope of the accompanying claims.

What is claimed is:

1. A process for producing hydrogen gas comprising the steps of: passing a current through electrodes disposed within a hydrocarbon oil layer which is formed as a supernatant layer above a water layer, electrically dissociating the water layer and forming whereby a continuous outflow of hydrogen, and replenishing the water which is electrically dissociated in the aforementioned manner.

2. The process in accordance with claim 1, including the step of collecting the hydrogen which is liberated above the surface of the oil-water layers and removing such hydrogen from the situs of generation.

3. The process in accordance with claim 1, including the step of collecting gaseous hydrocarbon fractions which accompany the gaseous hydrogen phase and subsequently separating such gases which accompany the hydrogen to form a substantially pure hydrogen gas output.

4. The process in accordance with claim 1 in which the electrodes are adjusted to control the vertical displacement between each electrode and the water level, and continuously injecting water to the reaction site to maintain the clearance between the electrode ends and the oil-water interface.

5. The process in accordance with claim 1 including the step of insulating the electrode portions which extend above the oil level and into the gaseous phase volume wherein the hydrogen gas is liberated.

6. The process in accordance with claim 1 including the step of blending the so-formed hydrogen with air to effect an air-hydrogen combination which is supplied to exhausted oil wells for restoring pressure with such blended gases and thereby effecting secondary oil recovery.

7. The process in accordance with claim 1 including the step of withdrawing the oil layer and periodically replenishing the oil layer with a hydrocarbon oil of unreacted composition.

8. The process in accordance with claim 1 including the step of supplying any one of a single-phase, 2-phase and 3-phase, high voltage, low amp alternating and direct current to said electrodes.

9. The process in accordance with claim 1 including a multiple series of cells wherein the water chambers are individually insulated, the oil is partially insulated, the gaseous chamber is common, and a power buss interconnects the electrodes in the respective cells.

10. The process in accordance with claim 1 in which said water includes an electrolyte.

11. The process in accordance with claim 4 in which the incoming water is subdivided into droplets which are sprinkled over the oil layer surface and sink to the water layer to provide the make-up water.

12. The process in accordance with claim 1 in which hydrocarboxy compounds and petroleum are separately recovered.

13. Apparatus for generating hydrogen gas comprising a chamber adapted to receive therein immissible layers of oil and water, respectively, a plurality of electrodes adapted to receive a preferred current charge and adapted to be immersed within the oil layers with the ends thereof a predetermined and relatively constant clearance from the interfacial area between the oil and water but disposed solely within the oil layer, means for imposing electrical potential across the electrodes wherein preferred current is transferred between such electrodes through a combination of the oil and water layers respectively to effect an electrical decomposition of the water, means for maintaining the water level within said chamber to maintain the said relatively constant clearance of the electrode ends from the interfacial area between said oil and water layers respectively, means for maintaining a preferred current flow between said electrodes in the vicinity of the interfacial boundaries separating the water and supernatant oil layers, and means for collecting hydrogen gas which is generated by the electrical decomposition of water, occurring in accompanyment to the passage of current between said electrodes.

14. The apparatus in accordance with claim 13 in which the electrical potential imposed across said electrodes is characterized by a one-phase, two-phase and three-phase current and approximately one amp drop per cell.

15. The apparatus in accordance with claim 14 in which the voltage developed between said electrodes is in the order of 2,000 to 3,000 volts per cell.

16. The apparatus in accordance with claim 14 in which said electrodes are insulated within said chamber at the gaseous layer surmounting the supernatent oil layer.

17. The apparatus in accordance with claim 14 including adjustment means for controlling the gap between the ends of the respective electrodes and the interstatial boundaries separating the water and supernatant oil layers.

18. The apparatus in accordance with claim 13 in which a plurality of cells each contains a wholly insulated water layer, a hydrocarbon layer partially included in each cell and partially in common to all the cells and a gaseous chamber common to all the cells, and buss means interconnecting the electrode in the respective cells.

19. The apparatus in accordance with claim 13 including means for replenishing the cells with water in which a V-shaped trough having spaced notches at the upper edges which subdivide the water into a sprinkle of droplets which fall onto the surface of the oil and thereafter descend into the water layer to replenish the water converted by electrodecomposition into its constituent gases.

* * * * *